United States Patent Office 2,775,621
Patented Dec. 25, 1956

2,775,621

HYDROGENATION OF FORMALDEHYDE CONDENSATION PRODUCTS

Alexander F. MacLean and Adin L. Stautzenberger, Corpus Christi, Tex., assignors to Celanese Corporation of America, New York, N. Y., a corporation of Delaware No Drawing. Application June 20, 1952,
Serial No. 294,705

3 Claims. (Cl. 260—635)

This invention relates to a hydrogenation process for the production of polyhydric alcohols from carbohydrate mixtures obtained in the catalytic condensation of formaldehyde, and relates also to a process for treating the carbohydrate mixture to prepare it for hydrogenation.

It is known to condense formaldehyde to carbohydrate mixtures comprising hydroxy aldehydes and hydroxy ketones. It is also known to hydrogenate such carbohydrate mixtures. However, in the prior art processes the hydrogenation of these carbohydrate mixtures require very high pressures, necessitating expensive plant equipment, in order to obtain appreciable hydrogenation of the mixture. Another disadvantage of the prior art processes is that they caused a greatly decreased activity and shorter life of the hydrogenation catalyst.

It is an object of our invention to provide a process for the production of polyhydric alcohols from the carbohydrate mixtures produced by the condensation of formaldehyde, which will be free from the foregoing and other disadvantages.

It is a further object of our invention to provide a process for the hydrogenation of carbohydrate mixtures which does not require drastic hydrogenation conditions and which can, therefore, be used with less expensive plant equipment, which will not unduly shorten the life or decrease the activity of the catalyst employed, and which will produce polyhydric alcohols of improved color and purity.

Still another object of our invention is the provision of an improved process for preparing for hydrogenation a carbohydrate mixture produced by the condensation of formaldehyde.

Other objects of this invention will appear from the following detailed description.

The process of our invention involves the treatment of a carbohydrate mixture produced by the metal compound catalyzed condensation of aqueous formaldehyde. The process of our invention involves the steps of treating the carbohydrate mixture to remove the combined metal, of substantially removing the formaldehyde, and of effectively removing most of the acidic constituents, and, after these steps, the step of catalytically hydrogenating the mixture.

The crude aqueous carbohydrate mixture to be treated may be produced by any process involving the condensation of aqueous formaldehyde in the presence of a polyvalent metal compound catalyst for the condensation. It may be made by a batch process or by a continuous process. The catalyst used is preferably a lead compound, such as lead formate, lead nitrate or basic lead acetate, but certain other polyvalent metal compounds may be employed as catalysts, such as tin formate, tin chloride, cerium chloride or thorium chloride. A particularly desirable process is the one described in copending application Serial No. 289,894, filed May 24, 1952, in the names of A. F. MacLean and W. E. Heinz. As shown in that application, a mixture of aqueous formaldehyde, a lead compound and an alkaline material is passed continuously into a reactor in which there is a high degree of back mixing, or recycling, of feed and reaction product, and reaction product is withdrawn continuously from the reactor. While the process of the present invention is suitable for use with the carbohydrate mixtures produced by the process of any of the examples given in said copending application, it is also applicable to the other carbohydrate mixtures produced by condensation of aqueous formaldehyde in the presence of a polyvalent metal catalyst.

The polyvalent metal compound catalyst may be removed from the carbohydrate mixture by any of several methods. In the preferred method the carbohydrate reaction mixture is passed over an acidic cation-exchange resin, such as a phenol sulfonic acid-formaldehyde reaction product or a sulfonated styrene-divinyl benzene copolymer, such resins being exemplified by Rohm and Haas Amberlite IR 120. This effects the removal of the combined metal, such as lead, and also decreases the pH of the carbohydrate mixture, for example to a pH of 3.5 to 2. Another method of removing the combined metal, such as lead, is by addition of oxalic or sulfuric acid to precipitate the lead as the insoluble lead oxalate or sulfate, which likewise reduces the pH of the mixture.

The formaldehyde is preferably removed from the carbohydrate mixture by distillation at a pH of about 5 to 3. To insure adequate removal of the formaldehyde in the distillation step, the formaldehyde content of the mixture should not be over 5%. Where it is over 5% the mixture should be diluted with water to a formaldehyde content of 5% or less. The distillation may be carried out by introducing the mixture into the middle of a packed column, with or without column reflux and maintaining a base temperature of 102 to 105° C. If desired, the distillation may be carried out under pressure.

The removal of formaldehyde should be carried out until the formaldehyde content is 0.5% or less, preferably in the range of 0.2 to 0%. This removal of formaldehyde is essential in order to insure adequate rapid hydrogenation at temperatures low enough to avoid substantial decomposition of the carbohydrate mixture, i. e. temperatures which are not over 150° C. The decrease in formaldehyde content also insures the maintenance of the activity of the catalyst over a long period of time.

The step of removing most of the acidic constituents from the mixture may be carried out in any one of several ways. For example, the mixture may be treated directly after removal of the combined metal, or after the removal of the formaldehyde, with an alkaline anion-exchange resin, such as phenylene diamine-formaldehyde resin, a triethylene tetramine-phenol-formaldehyde resin, or the reaction product of an amine and a chloromethylated styrene-divinyl benzene copolymer, such resins being exemplified by Rohm and Haas Amberlite resin. As an alternative, the mixture may be treated, either before or after the removal of formaldehyde, with an alkaline alkali metal compound, such as sodium hydroxide or sodium carbonate, or a tertiary amine, such as triethyl amine, to adjust the pH to a value of 5 to 7. This alternative introduces a small amount of salts into the final hydrogenated product.

The steps of eliminating the polyvalent metal catalyst and of removing the acidic constituents may be combined, if desired, as by the use of sodium oxalate or sodium sulfate and to precipitate the lead as the insoluble lead oxalate or sulfate and form sodium salts, e. g. sodium formate.

When a cation-exchange resin is employed it is preferably regenerated by treating it with an acid which forms a soluble lead compound, such as nitric acid, and then washing it with water.

When an anion-exchange resin is employed it is regenerated by passing through it a solution of an alkaline material, such as sodium carbonate, followed by washing with water.

Optimum results are obtained when the hydrogenation step is carried out at a pressure of 500 to 2000 pounds per square inch gauge in the presence of a catalyst for the hydrogenation, such as Raney nickel or Raney cobalt. The hydrogenation is preferably continued until one mole of hydrogen per mole of carbohydrate is absorbed. The temperature of hydrogenation should not be above 150° C., since temperatures above this cause rapid decomposition of the carbohydrate feed. With respect to the concentration of the carbohydrate to be hydrogenated, it has been found that aqueous carbohydrate mixtures containing over 60% of carbohydrates are more difficult to hydrogenate than those of lower carbohydrate content. A carbohydrate content of 10 to 20% in the mixture is preferred. For best results, the pH of the mixture being hydrogenated should be within the range of 5 to 7. A pH higher than 7 causes some carbohydrate condensation, and a pH less than 5, e. g. a pH of 3 reduces the hydrogenation rate and may dissolve some of the catalyst.

In order further to illustrate our invention but without being limited thereto the following examples are given:

*Example I*

An aqueous mixture containing 10% aqueous formaldehyde and sufficient basic lead acetate to give a mole ratio of formaldehyde to lead ions of 760:1 is pumped continuously into a reactor provided with a reflux condenser and having an adjustable overflow arrangement for maintaining the liquid therein at any desired constant level. The contents of the reactor are maintained at 100° C. and are circulated continuously so that there is virtually complete back mixing of feed and product. The pH in the reactor is maintained at 7.5 by addition of triethylamine. The feed is pumped in at such a rate as to give a residence time in the reactor of 20 minutes. The effluent from the overflow is cooled to a temperature of 20° C. to stop the reaction. Analysis of the effluent shows that the degree of conversion of the formaldehyde to carbohydrates is 80%.

The carbohydrate mixture thus obtained as the effluent is passed through a column of Rohm and Haas IR No. 120, a strongly acid sulfonic acid cation exchange resin in bead form, which resin has been regenerated by passing through it 2% aqueous nitric acid followed by distilled water. Following this treatment the carbohydrate mixture is passed continuously into the middle of a distillation column where it is distilled at a pressure of 15 pounds per square inch and with a reflux ratio of 1:1. For each three volumes of feed, two volumes of aqueous formaldehyde are removed as distillate and one volume of aqueous solution of the carbohydrate mixture as residue. This aqueous carbohydrate mixture, obtained as the residue, has a pH of 2.9 and a formaldehyde content of 0.01%, determined colorimetrically by the chromotropic acid method. Water is added to the aqueous carbohydrate mixture to reduce its carbohydrate concentration to 10% by weight, following which a 0.1 N solution of sodium hydroxide is added to raise the pH of the carbohydrate mixture to 5. 210 parts by weight of the resulting mixture are mixed with 20 parts by weight of a moist Raney nickel catalyst, composed of 75% by weight of nickel and 25% by weight of water, and charged into a rocking autoclave, made of A. I. S. I., type 316 stainless steel, so as to fill the autoclave to about two thirds of its capacity. The free space in the rocking autoclave is then filled with hydrogen gas at 2000 pounds per square inch gauge. The hydrogen feed is then shut off. The pressure in the autoclave drops due to reaction of hydrogen with the carbohydrate mixture. When the pressure has been reduced to 1800 pounds per square inch gauge by such reaction, hydrogen gas is again fed into the autoclave to increase the pressure to 2000 pounds per square inch gauge. This procedure is repeated as long as hydrogenation continues, until the reaction mixture has absorbed the theoretical amount of hydrogen, based on the carbonyl content of the original charge. At this point analysis of the reaction mixture shows a zero concentration of carbonyl, as determined by the hydroxylamine method, and a zero concentration of reducing sugars, as determined by Fehling's test. This point of complete hydrogenation is reached after 35 minutes of hydrogenation, with the temperature of the reaction having been maintained at a room temperature of 35° C. The autoclave is vented and the Raney nickel removed from the hydrogenated product by filtration.

The hydrogenation product may be separated into its components by any convenient method such as distillation under reduced pressure. For example, when distillation is employed, water is removed from the hydrogenated mixture by distilling at a pressure of 100 mm. of mercury absolute; ethylene glycol and a small amount of water are removed at a pressure of 1 mm. of mercury absolute; glycerol is removed at a pressure of 20 to 100 microns of mercury absolute; and erythritol is removed at a pressure of 50 to 100 microns of mercury absolute, but at a higher temperature. The remainder of the hydrogenated mixture is classified as non-volatile. The yields of these materials show substantially complete hydrogenation.

*Example II*

Example I is repeated, with the exception that prior to the dilution step a small amount of formaldehyde is added so as to bring the formaldehyde concentration of the hydrogenation feed to 0.50% by weight. It is found that hydrogenation does not take place at room temperature and that it is necessary to apply heat to effect hydrogenation. When heat is applied at a rate such that the temperature of the reaction mixture increases by 1° C. per minute, hydrogenation commences at 70° C. and is completed at 150° C.

*Example III*

Example I is repeated, with the exception that prior to the dilution step a small amount of formaldehyde is added so as to bring the formaldehyde concentration of the hydrogenation feed to 1.00% by weight. It is found that hydrogenation does not take place at room temperature and that it is necessary to apply heat to effect hydrogenation. When heat is applied at a rate such that the temperature of the reaction mixture increases by 1° C. per minute, no hydrogenation is observed to take place below 100° C. After 1½ hours at 150° C. only 49% of the feed is hydrogenated. At the end of this time the autoclave is cooled, the catalyst is removed as a slurry and the hydrogenation activity of the catalyst is tested. The catalyst slurry obtained from the reaction mass after the hydrogenation process of Example I is likewise tested for hydrogenation activity, and is found to be more than 3 times as active as the catalyst slurry obtained from the hydrogenation of the feed containing 1.00% of formaldehyde.

*Example IV*

In an experiment similar to Example II the formaldehyde content is adjusted to 0.1% and the pH to 5. Hydrogenation is initiated at 30° C. and completed at 130° C.

Examples I to IV above show the deleterious effects of formaldehyde in the hydrogenation process. Similar reuslts are obtained in tests at other pH values. For example, a series of experiments carried out at a pH of 7 showed that amounts of formaldehyde above 0.5% seriously interfered with the hydrogenation process.

It is to be understood that the foregoing detailed description is given merely by way of illustration and that many variations may be made therein without departing from the spirit of our invention.

Having described our invention what we desire to secure by Letters Patent is:

1. A process for the hydrogenation of an aqueous mixture of carbohydrates produced by the condensation of aqueous formaldehyde in the presence of a multivalent metal compound which is a catalyst for said condensation, comprising the steps of removing said multivalent metal as an insoluble compound from said carbohydrate mixture, bringing the pH of said mixture to between 3 and 5, and then directly, without further treatment, distilling said mixture, containing at most 5% of formaldehyde, at a pH between 3 and 5 to remove formaldehyde therefrom to bring the formaldehyde content thereof to not more than 0.5%, removing most of the acidic constituents of the mixture, and hydrogenating the aqueous carbohydrate mixture containing 10 to 20% of said carbohydrate resulting from the preceding steps at a pressure of 500 to 2000 pounds per square inch gauge in the presence of a catalyst for the hydrogenation.

2. A process as set forth in claim 1 in which the condensation catalyst is a lead compound and is removed from said mixture by treating the mixture with a cation-exchange resin.

3. A process as set forth in claim 2 in which the step of removing most of the acidic constituents is carried out by passing the carbohydrate mixture over an anion-exchange resin.

References Cited in the file of this patent

UNITED STATES PATENTS

| | | |
|---|---|---|
| 2,224,910 | Hanford et al. | Dec. 17, 1940 |
| 2,269,935 | Hanford et al. | Jan. 13, 1942 |
| 2,276,192 | Hanford et al. | Mar. 10, 1942 |
| 2,372,602 | Owens | Mar. 27, 1945 |
| 2,463,677 | Brandner | Mar. 8, 1949 |
| 2,562,102 | Jackson et al. | July 24, 1951 |

FOREIGN PATENTS

| | | |
|---|---|---|
| 514,342 | Great Britain | Nov. 6, 1939 |